United States Patent [19]
Kanno et al.

[11] Patent Number: 5,165,509
[45] Date of Patent: Nov. 24, 1992

[54] BIDIRECTIONAL RETAINING CLUTCH

[75] Inventors: Hidenori Kanno; Yukihisa Kajiyama; Hisatoshi Iwai; Mashmichi Muroi, all of Tokyo, Japan

[73] Assignee: Fuji Seiki Kabushiki Kaisha, Japan

[21] Appl. No.: 780,039

[22] Filed: Oct. 21, 1991

[30] Foreign Application Priority Data

Dec. 17, 1990 [JP] Japan ................... 2-411076

[51] Int. Cl.$^5$ ............................................. F16D 41/10
[52] U.S. Cl. ........................................ 192/44; 16/342; 188/82.2
[58] Field of Search ............... 192/44, 56 R; 188/82.2; 16/341, 342

[56] References Cited

U.S. PATENT DOCUMENTS

| | | | |
|---|---|---|---|
| 1,057,495 | 1/1913 | Packer | 192/44 |
| 2,490,172 | 12/1949 | Swahnberg | 192/56 R X |
| 3,877,253 | 4/1975 | Yeagle | 192/56 R X |
| 3,908,487 | 9/1975 | Plaw | 192/44 X |
| 4,332,056 | 6/1982 | Griffin et al. | 16/341 |
| 4,750,685 | 6/1988 | Frei | 192/56 R X |
| 5,008,976 | 4/1991 | Busch | 16/342 X |

FOREIGN PATENT DOCUMENTS

| | | | |
|---|---|---|---|
| 677947 | 1/1964 | Canada | 192/56 R |
| 2034420 | 6/1980 | United Kingdom | 192/56 R |

Primary Examiner—Rodney H. Bonck
Attorney, Agent, or Firm—Steinberg & Raskin

[57] ABSTRACT

A bidirectional retaining clutch capable of stopping rotation of a rotated object such as a revolving shaft of a pivoted cover of a personal computer, a door sheave of a sliding door or the like in one direction at any desired position while keeping it freely rotatable, as well as ensuring free rotation of the rotated object in an opposite direction as desired when torque of a predetermined level or more is applied. An outer cylindrical structure arranged so as to rotated relative to a shaft includes a pair of roller positioning members each provided on an inner surface with roller receiving recesses of an elliptic shape. The rollers which are received in the recesses selectively move in the recesses so as to permit the shaft to be revolved relative to the outer cylindrical structure in one direction while preventing revolution of the shaft in an opposite direction. When torque of a predetermined level or more in the opposite direction is applied to the shaft, the rollers move in the recesses again to permit it to be rotated in the opposite direction.

22 Claims, 6 Drawing Sheets

BIDIRECTIONAL RETAINING CLUTCH

BACKGROUND OF THE INVENTION

This invention relates to a bidirectional retaining clutch, and more particularly to a bidirectional retaining clutch which is connected to a rotator such as a revolving shaft of a pivoted cover, a revolving shaft of a pivoted door, a door sheave of a sliding door or the like to not only stop revolution of the rotator in one direction at any desired position while preventing reverse revolution of the rotator but permit revolution of the rotator in the other direction when torque of a predetermined level or more in the other direction is applied thereto.

Conventionally, there has been used a retaining device of the cam type for the purpose of causing a pivoted or rotated component (hereinafter referred to as "rotated object") such as, for example, a pivoted lid or cover vertically pivotally moved about a revolving shaft which is used in a personal computer of the lap top type, a piano or a closet; a pivoted door; a door sheave of a sliding door traveling on a slanting rail; or the like to be stopped at any desired position during the opening or closing operation. The conventional cam-type retaining device is generally constructed in such a manner that a cam stops movement of the rotated object when it is opened by a predetermined angle and subsequent closing of the rotated object is started by lifting it a little, so that the rotated object may be downward pivotally moved.

Unfortunately, the cam-type retaining device is adapted to stop movement of the rotated object only when it is opened to a predetermined position, to thereby fail to stop the movement at any desired position.

In order to avoid the disadvantage, it would be considered to provide the device with a one-way clutch to retain the rotated object at any desired position. The arrangement of the one-way clutch permits the rotated object to be retained at any desired position during the operation of opening it; however, it fails to close the rotated object when it is forced in a closed direction from the retained position, because it is kept retained. Therefore, the arrangement of the one-way clutch on the conventional cam-type retaining device requires to connect, to the one-way clutch, a release device which is adapted to cause the one-way clutch to be forcibly rotated when the rotated object is moved in the closed direction.

SUMMARY OF THE INVENTION

The present invention has been made in view of the foregoing disadvantage of the prior art.

Accordingly, it is an object of the present invention to provide a bidirectional retaining clutch which is capable of supporting a rotated object in a manner to keep it rotatable in either direction while ensuring the stopping of movement of the rotated object at any desired position.

It is another object of the present invention to provide a bidirectional retaining clutch which is capable of effectively preventing, when a rotated object is being moved in a direction, it from being moved in a direction opposite thereto.

It is a further object of the present invention to provide a bidirectional retaining clutch which is capable of permitting a rotated object to be moved in an opposite direction by applying torque of a predetermined level or more in the direction to the rotated object.

It is still another object of the present invention to provide a bidirectional retaining clutch which is capable of stopping the operation of closing and opening a rotated object at any desired position.

It is yet another object of the present invention to provide a bidirectional retaining clutch which is capable of effectively preventing undesirable movement of a rotated object due to application of unexpected external force thereto.

It is a still further object of the present invention to provide a bidirectional retaining clutch which is capable of effectively and positively exhibiting a function of retaining a rotated object.

It is a yet further object of the present invention to provide a bidirectional retaining clutch which is capable of exhibiting the above-described functions with a simple structure.

In accordance with the present invention, a bidirectional retaining clutch is provided. The clutch includes a shaft and an outer cylindrical structure fitted on the shaft. The shaft and outer cylindrical structure are arranged so as to be rotated relative to each other. The clutch also includes rollers arranged between the shaft and the outer cylindrical structure and roller receiving recesses for receiving the rollers therein, respectively. The roller receiving recesses are provided on any one of an inner surface of the outer cylindrical structure and an outer surface of the shaft in a manner to be spaced from one another in a circumferential direction of the outer cylindrical structure or shaft. The roller receiving recesses each are formed into a substantially elliptic shape in section of which the major axis is defined in the circumferential direction of the shaft or outer cylindrical structure so as to have a bottom surface section and curved side surface sections contiguous to both sides of the bottom surface section. The bottom surface section and curved side surface sections of each of the roller receiving recesses are formed in such a manner that the shallowest portion of the roller receiving recess is defined between the bottom surface section of the roller receiving recess and the outer surface of the shaft or the inner surface of the outer cylindrical structure and is smaller than the diameter of the roller. The portion of the outer cylindrical structure or shaft at which each of the roller receiving recesses is provided is formed so as to be resiliently deformed to expand the shallowest portion of the roller receiving recess to a degree sufficient to permit the roller to pass through the shallowest portion when force of a predetermined level or more is applied to the portion. The bidirectional retaining clutch further includes a pressing means for constantly forcing the roller positioned at any one of the curved side surface sections of each of the roller receiving recesses toward the shallowest portion of the receiving recess.

In a preferred embodiment of the present invention, the resiliently deformed portion and the bottom surface section of the roller receiving recess are arranged so as to positionally correspond to each other. The resiliently deformed portion may be formed into a reduced thickness.

In a preferred embodiment of the present invention, the bottom surface sections of the roller receiving recesses each are formed so as to be substantially parallel to a tangent line of a portion of the outer cylindrical structure or shaft opposite to the central portion of the bottom surface section. The roller receiving recesses may be provided on the inner surface of the outer cylindrical structure. The outer cylindrical structure may comprise an outer casing formed into a hollow cylindrical shape, two roller positioning members of a substantially annular shape arranged in the casing in a manner to be spaced from each other in an axial direction of the casing to define a space therebetween, and two pressing pin holding members of a substantially annular shape arranged between the roller positioning members in the casing in a manner to be spaced from each other. The pressing means may comprise a plurality of pressing pins provided in the pressing pin holding members in a manner to be spaced from one another in a circumferential direction thereof and a single pressing strip of an endless shape fitted on the pressing pins to resiliently inward force the pressing pins. The roller receiving recesses may be formed on an inner surface of the roller positioning members. The pressing means may be arranged between the roller positioning members in an axial direction of the clutch and between the outer casing and the shaft in a diametric direction thereof. Two such pressing pins may be provided for each of the rollers to force the roller. The roller positioning members and pressing pin holding members each may be made of a plurality of sheet materials formed by pressing and laminated on one another.

Alternatively, in a preferred embodiment of the present invention, the bottom surface sections of the roller receiving recesses each may be formed so as to project at a central portion thereof. The roller receiving recesses may be provided on the inner surface of the outer cylindrical structure. The outer cylindrical structure may comprise an outer casing, a pair of roller positioning members of a substantially annular shape arranged in the outer casing so as to be spaced from each other in an axial direction of the clutch to define a space therebetween and a roller holding member of a substantially annular shape arranged between the roller positioning members in the axial direction for holding the pressing means as well as the rollers therein. The roller receiving recesses may be formed on an inner surface of the roller positioning members. The pressing means may comprise a plurality of springs. The roller holding member may be formed on an inner surface thereof with a plurality of roller holding grooves for holding the rollers therein in a manner to be spaced from one another in a circumferential direction thereof and extend in an axial direction thereof and on an outer surface thereof with spring holding grooves for holding the springs therein in a manner to be spaced from one another in a circumferential direction thereof and extend in an axial direction thereof. The roller holding grooves and spring holding grooves may be arranged so as to positionally corresponds to each other. The roller holding members each may be made of a plurality of sheet materials formed by pressing and laminated together and the roller holding member may be integrally made of a rigid material.

BRIEF DESCRIPTION OF THE PREFERRED EMBODIMENTS

These and other objects and many of the attendant advantages of the present invention will be readily appreciated as the same becomes better understood by reference to the following detailed description when considered in connection with the accompanying drawings in which like reference numerals designate like or corresponding parts throughout; wherein.

DETAILED DESCRIPTION OF THE PREFERRED EMBODIMENTS

Now, a bidirectional retaining clutch according to the present invention will be described hereinafter with reference to the accompanying drawings.

FIGS. 1 to 4C illustrate an embodiment of a bidirectional retaining clutch according to the present invention.

Figure 1:
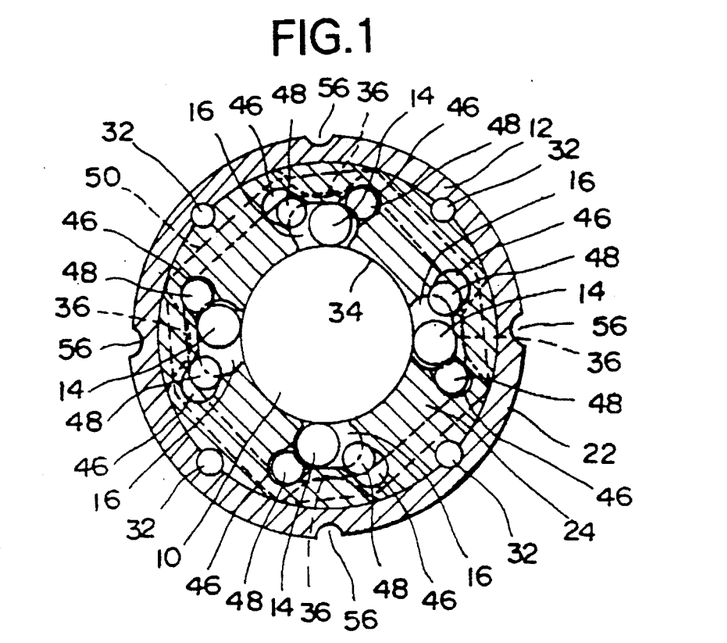
FIG. 1 is a vertical sectional front elevation view showing an embodiment of a bidirectional retaining clutch according to the present invention.
Figure 2:
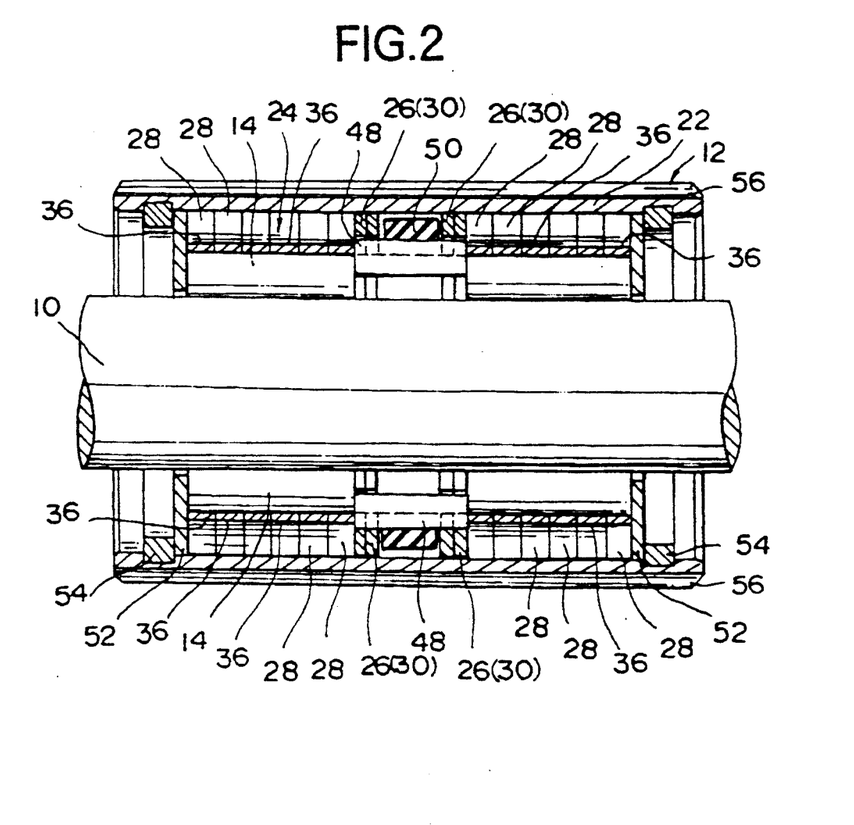
FIG. 2 is a sectional side elevation view of the bidirectional retaining clutch shown in FIG. 1.
Figure 3:
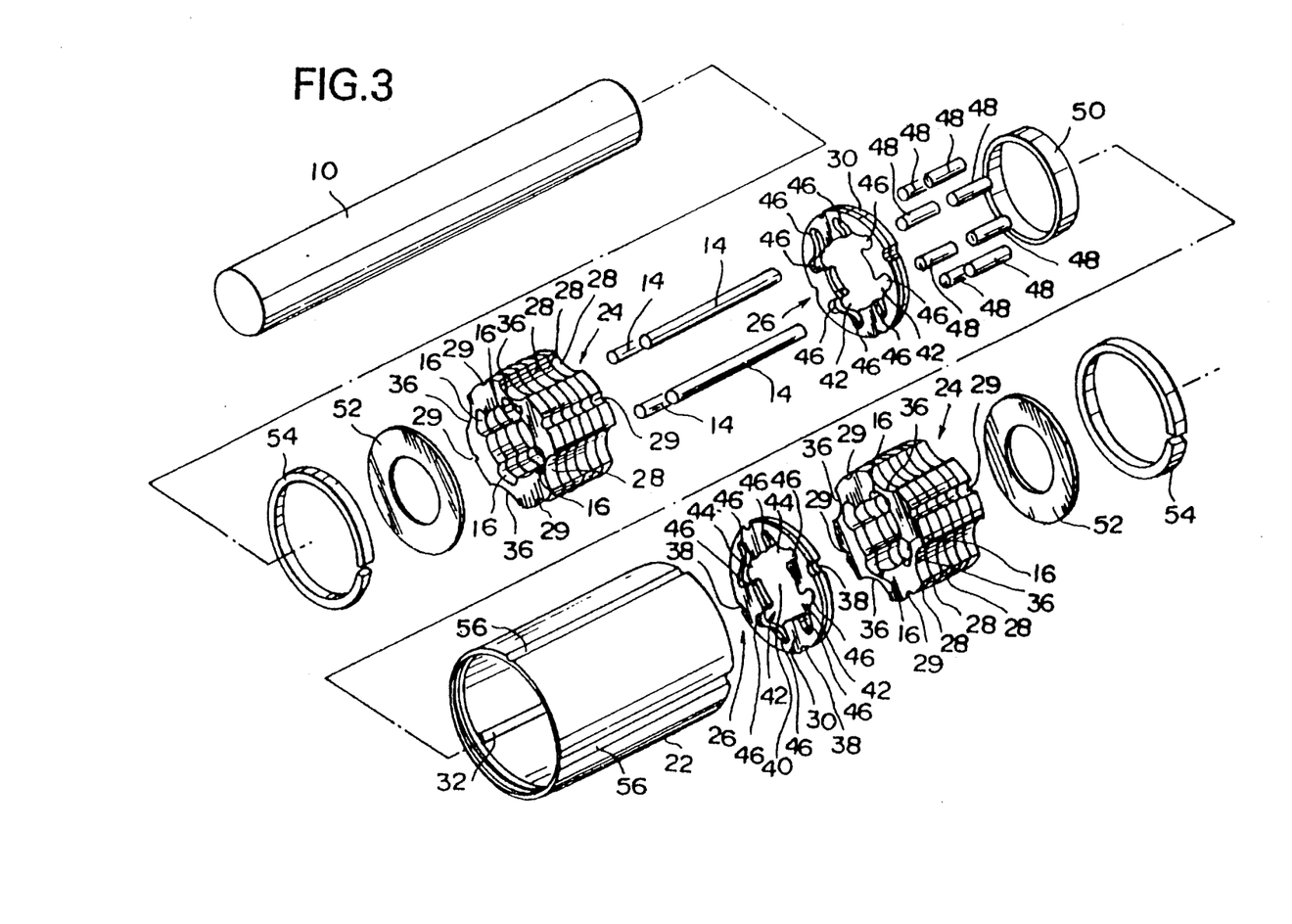
FIG. 3 is an exploded perspective view of the bidirectional retaining/clutch shown in FIG. 1.

A bidirectional retaining clutch of the illustrated embodiment generally includes a shaft 10 which may be formed into a round shape in section and connected to, for example, one of a stationary base of a rotated object such as a pivoted cover arranged at a personal computer of the lap top type so as to be vertically pivotally moved and its revolving shaft, an outer cylindrical structure 12 connected to the other one of the stationary base and revolving shaft and fitted on the shaft 10, and a suitable number of rollers 14 arranged between the shaft 10 and the outer cylindrical structure 12 in a diametric direction of the clutch. In the illustrated embodiment, four such rollers 14 are arranged, however, three such rollers 14 may be conveniently arranged therebetween. The shaft 10 and outer cylindrical structure 12 are adapted to be rotated relative to each other.

The bidirectional retaining clutch of the illustrated embodiment also includes roller receiving recesses 16 for receiving the rollers 14 therein, respectively, which are provided on an inner surface of the outer cylindrical structure 12 or an outer surface of the shaft 10 in a manner to be spaced from each other at suitable or equal intervals in a circumferential direction of the outer cylindrical structure 12 or shaft 10. The so-arranged roller receiving recesses 16 each are formed into a substantially elliptic shape in section of which the major axis is defined in the circumferential direction of the outer cylindrical structure or shaft, so that an opening or inlet section of the recess 16 is relatively narrowed or restricted. More particularly, each of the roller receiving recesses 16 includes a bottom surface section 18 of a suitable width and curved side sections 20 contiguous to both sides of the bottom surface section 18 in the circumferential direction which are formed in such a manner that the shallowest portion of the recess 16 is defined by the shortest distance between the bottom section 18 of the recess 16 and the outer surface of the shaft 10 or the inner surface of the outer cylindrical structure 12 and is smaller than the diameter of the roller 14. Also, the portion of the outer cylindrical structure 12 or shaft 10 at which each of the roller receiving recesses 16 is provided is constructed so as to be resiliently deformed to expand the shallowest portion of the recess 16 to a degree sufficient to permit the roller 14 to pass through the shallowest portion when force of a predetermined level or more is applied to the portion.

Figure 4A:
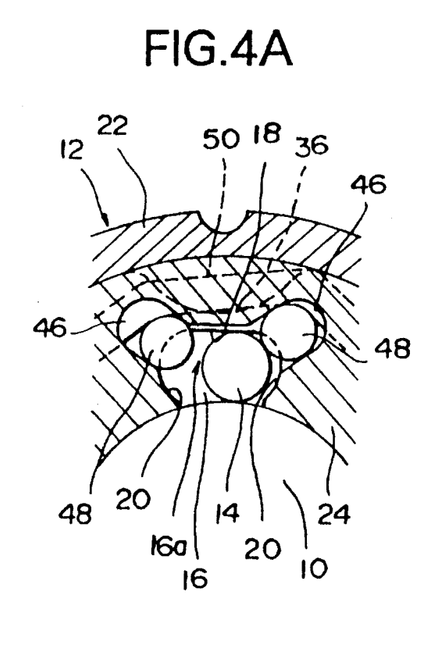
FIGS. 4A to 4C each are a fragmentary enlarged sectional view of an essential part of the bidirectional retaining clutch of FIG. 1 showing the manner of operation of the clutch.
Figure 4B:
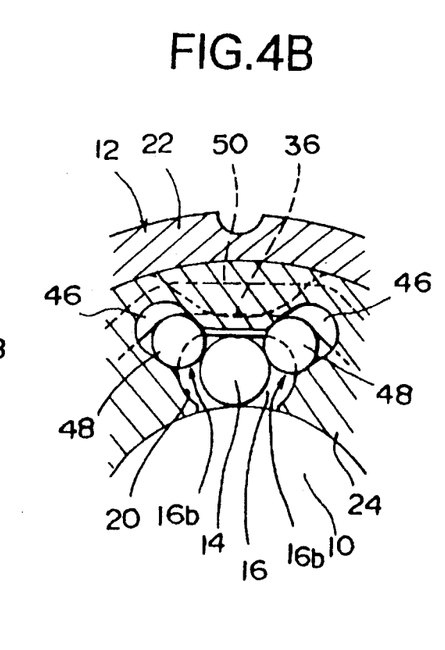
Figure 4C:
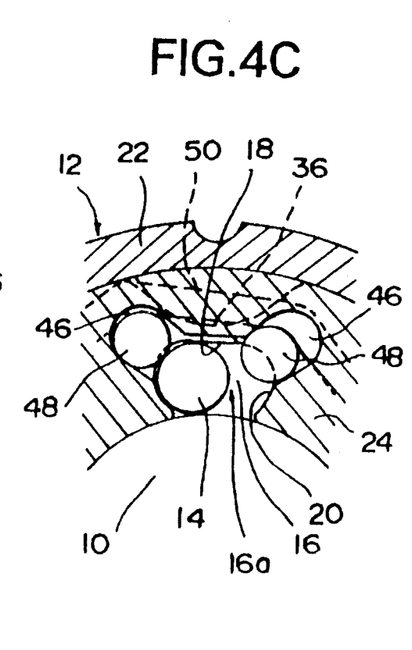

In the illustrated embodiment, four such roller receiving recesses 16 are formed on the inner surface of the outer cylindrical structure 12 in a manner to be spaced at substantially equal intervals in the circumferential direction. Also, in the illustrated embodiment, the bottom surface sections 18 each are formed so as to be substantially parallel to a tangent line of the portion of the shaft 10 opposite to the central portion of the bottom surface section 18. In the illustrated embodiment, the above-described configuration and arrangement of each of the roller receiving recesses 16 permits a distance between the deepest portion of each of the curved side sections 20 and the periphery of the shaft 10 to be defined to be somewhat larger than the diameter of the roller 14. Thus, the roller receiving recesses 16 each are provided at a substantially central portion thereof with the shallowest region 16a and at both side portions thereof with turnout regions 16b, as shown in FIGS. 4A to 4C. Further, in the illustrated embodiment, the portion of the shaft 10 or outer cylindrical structure 12 at which each of the roller receiving recesses 16 is provided is formed so as to be resiliently deformed to expand the shallowest portion of the roller receiving recess 16 to a degree sufficient to permit the roller 14 to pass through the shallowest portion when force of a predetermined level or more is applied to the portion.

The bidirectional retaining clutch further includes a pressing means for constantly forcing the roller 14 positioned at any one of both curved side surface sections 20 of each of the roller receiving recesses 16 toward the shallowest portion of the recess 16. The roller 14 thus forced while being kept pressedly contacted with the shaft 10 causes the bottom surface section 18 to be resiliently expanded to increase a gap between the shaft 10 and the bottom surface section 18 of the recess 16, resulting in being moved from the one curved side surface section 20 through the gap to the other curved side surface section 20. The pressing means will be detailedly described hereinafter.

In the illustrated embodiment, the outer cylindrical structure 12 includes an outer casing 22 formed into a hollow cylindrical shape, two roller positioning members 24 arranged in the casing 22 in a manner to be spaced from each other in an axial direction of the casing or clutch to define a space therebetween, and two pressing pin holding members 26 arranged between the roller positioning members 24 in the outer casing in a manner to be spaced from each other in the axial direction. The roller positioning members 24 each may comprise six sheet materials 28 formed by pressing and laminated on one another and the pressing pin holding members 26 each may comprise two sheet materials 30 formed by pressing and laminated on each other.

The roller positioning members 24, as shown in FIG. 3, each are formed on an outer periphery thereof with grooves 29, in which holding projections 32 provided on an inner surface of the outer casing 22 are fitted when the roller positioning members 24 are inserted into the casing 2, to thereby securely hold the members 24 in the casing 2. Also, the roller positioning members 24 each are formed at a central portion thereof with a through-hole 34 (FIG. 1) via which the shaft 10 is inserted. Thus, the roller positioning members 24 are formed into a substantially donut-like shape. The above-described roller receiving recesses 16 are provided on an inner peripheral surface of each of the roller positioning members 24 in a manner to be spaced from one another at substantially equal intervals in a peripheral or circumferential direction of the member 24. Further, the roller positioning members 24 each are so formed that the portion thereof at which each of the roller receiving recess 16 is provided is resiliently deformed to expand the shallowest portion of the recess 16 to a degree sufficient to permit the roller 4 to pass through the shallowest portion when force of a predetermined level or more is applied to the portion. For this purpose, the portion of the member 14 at which each of the recesses 16 is provided, particularly, the portion of the member 24 at which each of the bottom surface sections 8 is arranged is provided on an outer surface thereof with a cutout, resulting in being formed into a reduced thickness 36, so that it may exhibit desired resiliency. The reduced thickness portions 36 each are preferably provided at the portion of the roller positioning member 24 at which each of the bottom surface sections 18 is arranged.

The pressing pin holding members 26 each are formed on an outer periphery thereof with grooves 38 as shown in FIG. 3, in which the holding projections 32 of the inner surface of the outer casing 22 are fitted when the pressing pin holding members 26 are inserted into the casing 22, to thereby securely hold the members 26 in the casing 22. Also, the pressing pin holding members 26 each are formed at a central portion thereof with a through-hole 40 via which the shaft 10 is inserted. Thus, the pressing pin holding members 26 are formed into a substantially donut-like shape. Also, the pressing pin holding members each are formed on an inner periphery thereof with pressing pin holding grooves 42 in a manner to positionally correspond to the roller receiving recesses 16 of each of the roller positioning members 24. The pressing pin holding grooves 42 each comprise an elliptic section 44 formed into a width larger than the roller receiving recess 16 and the same length as the recess 16 and depression sections 46 formed on both sides of the elliptic section 44 in a manner to extend obliquely outward therefrom in directions opposite to each other. Each of the rollers 14 is inserted through the elliptic section 44.

Further, in the illustrated embodiment, the pressing means briefly described above is arranged between the roller positioning members 24 in the axial direction of the clutch and between the outer casing 22 and the shaft 10. More particularly, the pressing means includes eight pressing pins 48 arranged in the depression sections 46 of the pressing pin holding grooves 42 of the pressing pin holding members 26, so that two such pressing pins 48 arranged with respect to each of the rollers 14 to force it. Also, the pressing means includes a single pressing strip 50 of an endless or ring-like shape fitted on the pressing pins 48 against its own resiliency or elasticity to inward force the pressing pins 48 through the depression sections 46. The pressing strip 50 may be made of an elastic material such as rubber or the like. In the illustrated embodiment, the pressing strip 50 is fitted on the pressing pins while being expanded against its resilient force.

The rollers 14 each are formed into a length substantially equal to a distance between outer side surfaces of the roller positioning members 24 which are defined in the axial direction of the clutch when they are positioned in the outer casing 22, and the so-formed rollers 14 are received in the roller receiving recesses 16 of the members 24 in a manner to be parallel with the shaft 0 while being inserted through the elliptic sections 44 of the pressing pin holding grooves 42 of the pressing pin holding members 26. The pressing pins 48 each are formed into a length somewhat smaller than a length between opposite inner surfaces of the roller positioning members 4 which are defined in the axial direction of the clutch when they are positioned in the outer casing 22, and the so-formed pressing pins 48 are arranged in the depression sections 46 of the pressing pin holding grooves 42. On the pressing pins 48 are fitted the pressing strip 50, as described above. Arranged outside the roller positioning members 24 in the axial direction are holding plates 52, on the outside of which are disposed retaining rings 54, to thereby prevent dislocation or displacement of the roller positioning members 24 from the outer casing 22. The outer casing 22 is formed on an outer surface thereof with axially extending grooves 56, in which pin members (not shown) are fitted for securing the casing 22 with respect to a fixing member (not shown).

Now, the manner of operation of the bidirectional retaining clutch of the illustrated embodiment constructed as described above will be described hereinafter with reference to FIGS. 4A to 4C as well as FIGS. 1 to 3.

For example, the bidirectional retaining clutch may be arranged in such a manner that the shaft 10 is connected to a revolving shaft of a vertically pivoted lid or cover of a personal computer of the lap top type and the outer casing 22 is connected to a stationary base of the pivoted cover. When the cover is upward pivotally moved and then rendered free at any desired position, it tries to downward pivotally move by gravity, so that the revolving shaft of the cover likewise tries to revolve. This causes revolving force in a direction opposite to a direction of rotation of the revolving shaft due to the upward pivotal movement of the cover to be applied to the shaft 10; so that the roller 14 positioned in any one of the curved side surface sections 20 of each of the roller receiving recesses 16 or the right-hand curved side surface section 20 in FIG. 4A is moved toward the central region of the roller receiving recess 16 or in the left direction in FIG. 4A, resulting in being secured between the bottom surface section 18 of the recess 16 and the shaft 10, because the pressing pin 48 constantly urges the roller 14 toward the central portion of the recess 16. Thus, the upward movement of the pivoted cover can be stopped as desired. Then, when the cover is further upward moved, the roller is moved to the original position or the right-hand curved side surface section 20, resulting in being released from the securing between the bottom surface section 18 of the recess 16 and the shaft 10. Thus, the cover is permitted to be upward pivotally moved and stopped at any desired position.

When it is desired to downward pivotally move the cover to close the personal computer, the cover is forcibly downward pressed, so that the cover is rendered free, resulting in each of the rollers 14 being forcibly moved from the right-hand curved side surface section 20 toward the left-hand one. This causes the reduced thickness portion 36 of the roller positioning member 24 to be outward resiliently expanded to a degree sufficient to permit the roller 14 to pass through the shallowest region 16a of the recess 16 between the bottom surface section 18 and the outer surface of the shaft 10, as shown in FIG. 4B.

This causes each of the rollers 14 to be moved to the left-hand curved side surface section 20 as shown in FIG. 4C, so that the cover may be easily downward moved. Concurrently, this results in restraint in the opposite direction being applied to the cover, to thereby prevent the cover from being upward pivotally moved.

Then, when it is desired to upward pivotally move the cover to open the personal computer, the cover is forcibly upward pressed, so that the rollers 14 each are moved from the left-hand curved side surface section 20 (FIG. 4C) to the right-hand one (FIG. 4A).

In the embodiment shown in FIG. 1 to 3, the roller receiving recesses 16 are provided on the side of the outer cylindrical structure. However, they may be conveniently provided on the side of the shaft 10. Also, in the illustrated embodiment, the roller positioning members 24 and pressing pin holding members 26 each may be formed into an integral structure rather than a laminated structure.

The remaining part of the embodiment shown in FIGS. 1 to 3 may be constructed in a manner similar to another embodiment which will be described hereinafter with reference to FIGS. 5 to 8.

Referring now to FIGS. 5 to 8 illustrating another embodiment of a bidirectional retaining clutch according to the present invention, a bidirectional retaining clutch of the illustrated embodiment likewise generally includes a shaft 10, an outer cylindrical structure 12, rollers 14 and a pressing means. The pressing means comprises a plurality of springs 48' as described hereinafter. The outer cylindrical structure 12 includes an outer casing 22, a pair of roller positioning members 24 and a roller holding member 26' arranged between the roller positioning members 24 in an axial direction of the clutch for holding the pressing means or springs 48' therein. The roller holding member 26' is preferably formed into a rigid body.

Figure 6:
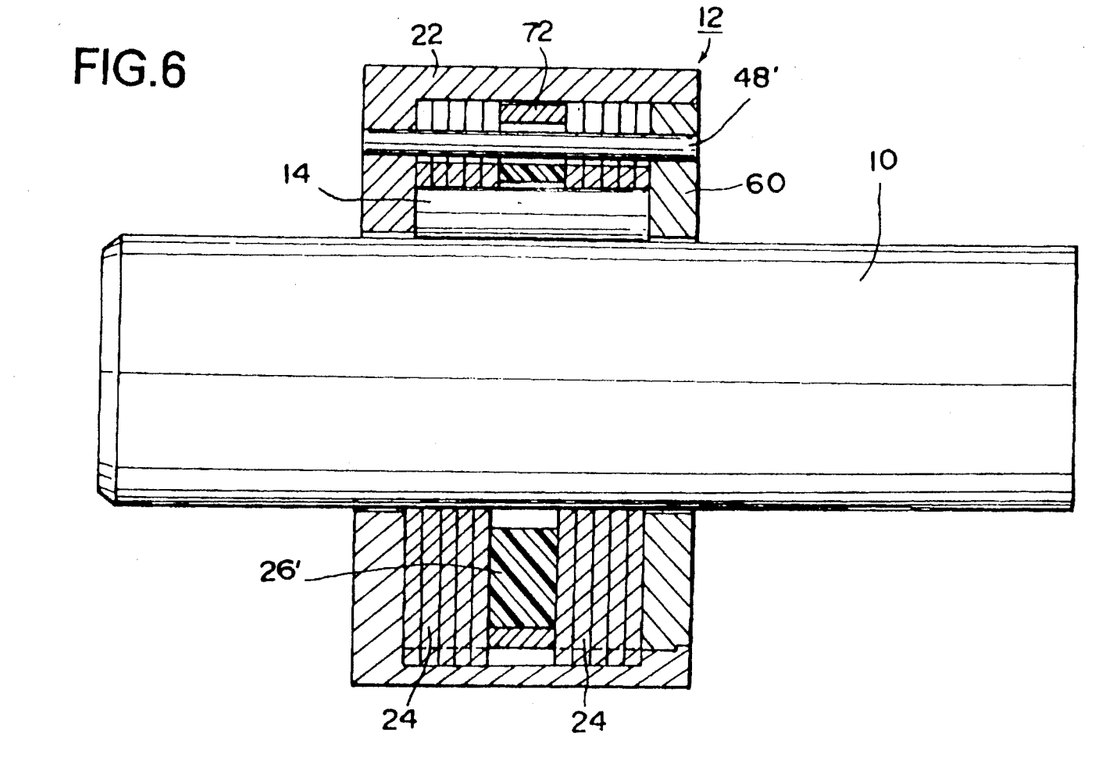
FIG. 6 is a vertical sectional side elevation view taken along line VI—VI of FIG. 5.

The outer casing 22, as shown in FIG. 6, comprises a hollow cylinder of which one end is closed and the other end is open. The closed end of the casing 22 is formed at the central portion thereof with a through-hole via which the shaft 10 inserted into the outer casing 22 and the open end of the casing 22 is closed with a lid 60 after the above-described respective members 10, 22, 24 and 26' are incorporated in the outer casing 22. The shaft 10 and outer casing 22 are arranged so as to be rotated relative to each other. The shaft 10 and casing 22 may be connected to a rotated object in substantially the same manner as the above-described embodiment.

Figure 7:
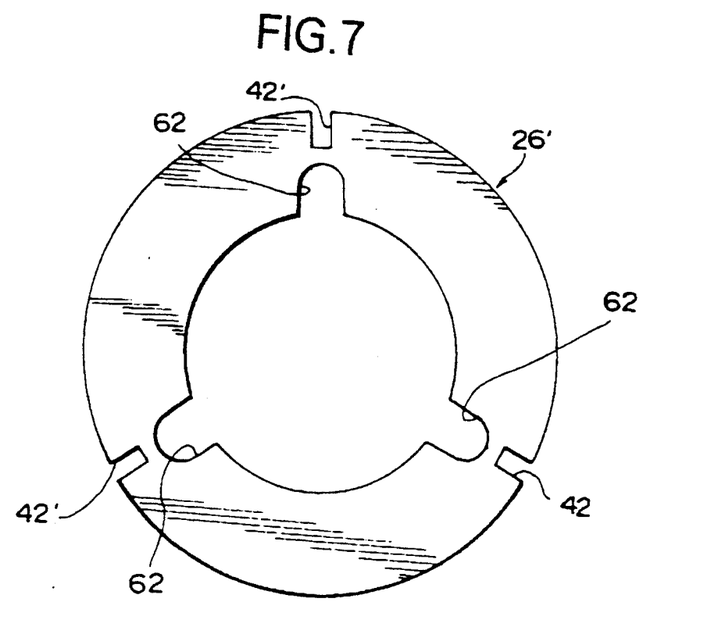
FIG. 7 is a front elevation view showing a roller holder incorporated in the bidirectional retaining clutch shown in FIG. 5.

The roller holding member 26' is made of a rigid material and formed into a substantially annular shape and a suitable thickness. The roller holding member 26' is formed on an inner peripheral surface thereof with a plurality of roller holding recesses or grooves 62 of a substantially U-shape as shown in FIG. 7. In the illustrated embodiment, three such grooves 62 are arranged at angular intervals of 120 degrees on the roller holding member 26'. Also, the roller holding member 26' is formed on an outer peripheral surface thereof with grooves 42' for holding the pressing means or springs 48' therein in a manner to positionally correspond to the roller holding recesses 62. Therefore, in the illustrated embodiment, three such spring holding grooves 42' are arranged on the roller holder 58. Thus, it will be noted that the roller holding member 26' acts to hold both rollers 14 and springs 48' therein. The roller holding member 26' is not only interposedly arranged between the roller positioning members 24 in the axial direction of the clutch but arranged between the outer casing 22 and the shaft 10 in a diametric direction of the clutch.

Figure 5:
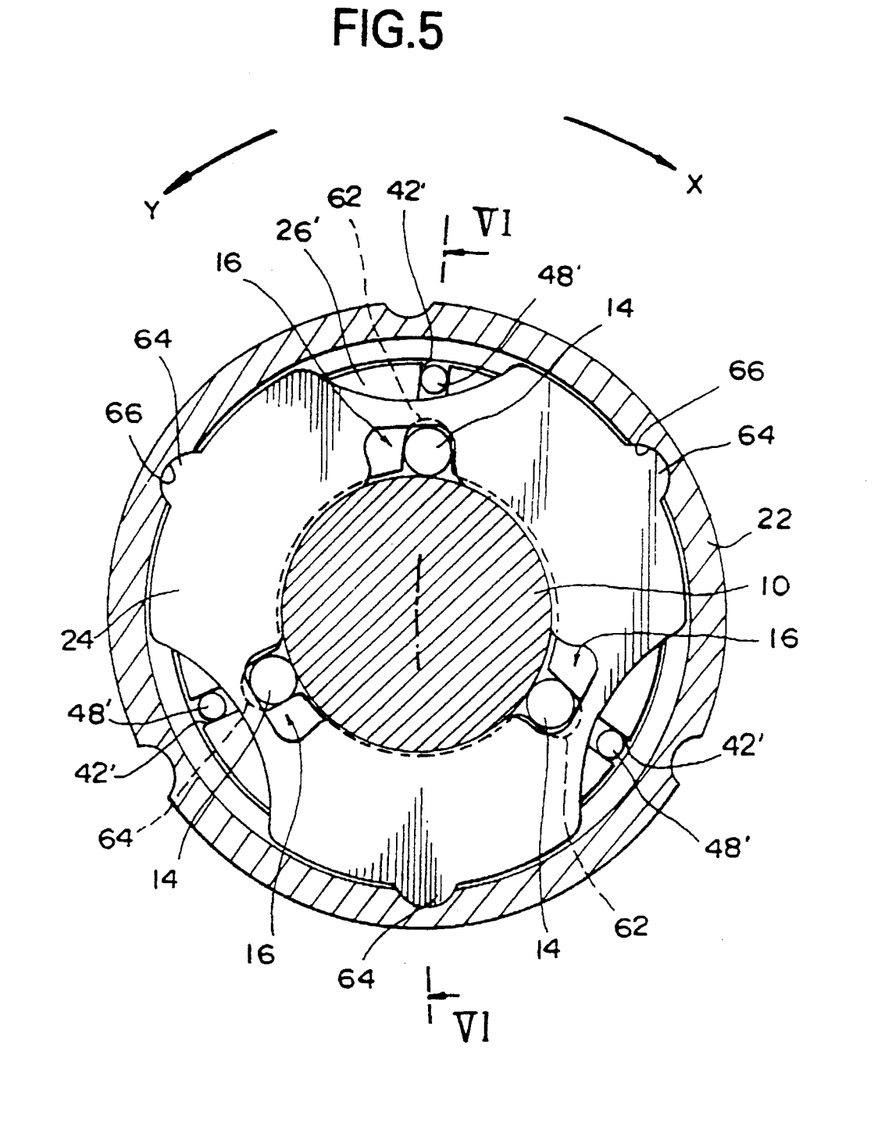
FIG. 5 is a vertical sectional view showing another embodiment of a bidirectional retaining clutch according to the present invention.

The rollers 14 each are made of a rod material and formed into a length which permits the roller to be received in the outer casing 22. In the illustrated embodiment, three such rollers 14 are arranged in the outer casing 22 as shown in FIG. 5.

The spring members 48' serve to regulate rotation of the roller holding member 26' to urge the rollers 14 in a predetermined direction. In the illustrated embodiment, the springs 48' each may be made of an elastic material such as, for example, a piano wire or the like and take the form of a coiled spring or the like. The springs 48' are held in the spring holding grooves 42' of the roller holding member 26' in a manner to extend therethrough in the axial direction of the clutch as shown in FIG. 6. The springs 48' each are fixed at both ends thereof on the outer casing 22. The above-described configuration and arrangement of the springs 48' may be varied as desired so long as they can exhibit such functions described above. Therefore, for example, it is not essential to provide the spring holding grooves 42' at the roller holding member 26' in a manner to positionally correspond to the roller holding grooves 62.

Figure 8:
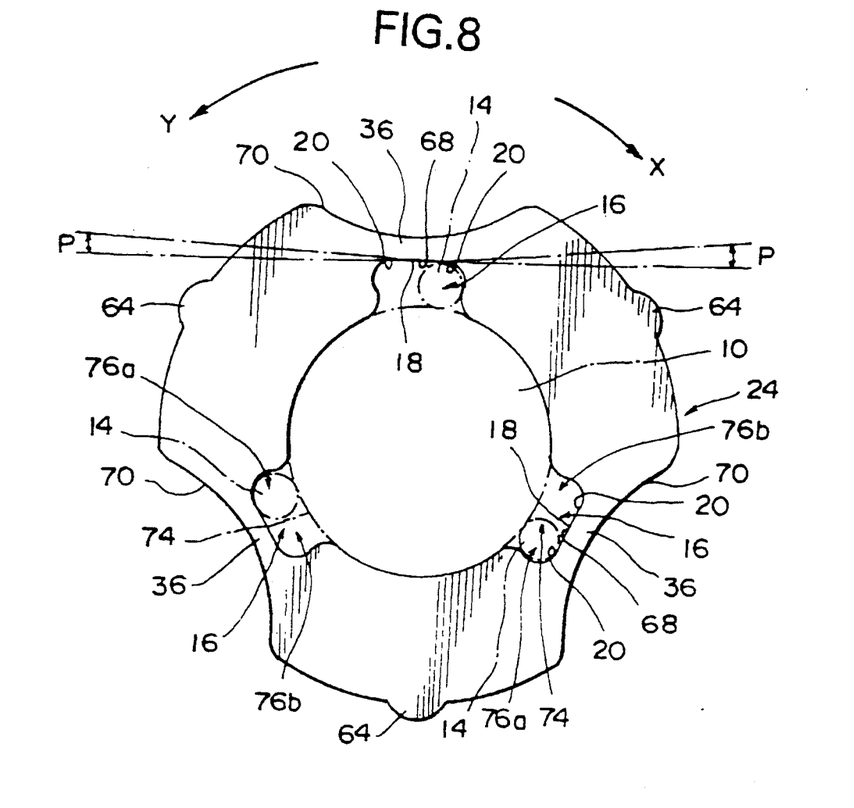
FIG. 8 is a front elevation view showing a roller positioning member incorporated in the bidirectional retaining clutch shown in FIG. 5.

The roller positioning members 24 are formed into a substantially annular shape like the roller holding member 26' and, as described above, arranged so as to interposedly hold the roller holding member 26' therebetween. The roller positioning members 24 each may be made of a plurality of sheet materials formed by pressing and laminated together. Also, the roller positioning members 24, as shown in FIGS. 5 and 8, each are formed on an outer peripheral surface thereof with a plurality of projections 64, which are engagedly fitted in recesses 66 formed on an inner surface of the casing 22 to prevent both members 22 and 24 from rotating relative to each other. Further, the roller positioning members 24 each are provided on an inner peripheral surface thereof with roller receiving recesses 16 in a manner to positionally correspond to the roller holding grooves 62 of the roller holding member 26', which recesses 16 each are adapted to receive the roller 14 therein to regulate movement of the roller. In the illustrated embodiment, the roller receiving recesses 16 each are formed into an elliptic shape in section of which the major axis is defined in a circumferential direction of the roller positioning member 26'. Also, the recess 16 is formed so as to have a bottom surface section 18 and curved surface sections 20 contiguous to both sides of the bottom surface section 18 which are formed in such a manner that the shallowest portion of the recess 16 is defined by the shortest distance between the bottom surface section 18 and the outer surface of the shaft 10 and formed to be smaller than the diameter of the roller 14. For this purpose, the bottom surface section 18 is projected at a central portion 68 thereof to a degree sufficient to permit wedge-like angles P to be defined on both sides of the projected central portion 68 of the bottom surface section 18. Such construction of the roller receiving recess 16 permits the smallest distance to be defined between the projected central portion 68 of the bottom surface section 18 and the shaft 10 and the curved side surface sections 20 to be remote from the peripheral surface the shaft 10 as compared with the bottom surface section 18. Also, in the illustrated embodiment, a distance between the deepest portion of each of the curved side sections 20 and the periphery of the shaft 10 is defined to be somewhat larger than the diameter of the roller 14. Thus, the roller receiving recesses 16 each are provided at a substantially central portion thereof with the shallowest region 74 and at both side portions thereof with turnout regions 76a and 76b.

It is a matter of course that the above-described construction of the roller receiving recess 16 is applicable to the embodiment described above with reference to FIGS. 1 to 3.

Also, the roller positioning members 24 each are so formed that the portion thereof at which each of the roller receiving recess 16 is provided is resiliently deformed to expand the shallowest region 74 of the recess to a degree sufficient to permit the roller to pass through the shallowest region 74 when force of a predetermined level or more is applied to the portion. For this purpose, the portion of the member 14 at which each of the recesses 16 is provided, particularly, the portion of the member 24 at which the bottom surface section 18 is arranged is provided on an outer surface thereof with a cutout 70, resulting in being formed into a reduced thickness 36, so that it may exhibit desired resiliency.

In FIG. 6, reference numeral 72 designates a ring-like spacer arranged between the roller positioning members 24 so as to be fitted on the roller holding member 26'.

The remaining part of the illustrated embodiment may be constructed in a manner similar to the embodiment described above with reference to FIGS. 1 to 3.

Now, the manner of operation of the bidirectional retaining clutch of the illustrated embodiment constructed as described above with reference to FIGS. 5 to 8 will be described hereinafter.

For example, the outer casing 22 is connected to a fixed base of a vertically pivoted lid or cover of a personal computer of the lap top type and the shaft 10 is connected to a revolving shaft of the pivoted cover. In such a state, the rollers 14 each are positioned in one of the turnout regions 76a and 76b (for example, the turnout region 76a in FIGS. 5 and 8) of each roller receiving recess 16 of each of the roller positioning members 24. The springs 48' each are fixed at both ends thereof on the casing 22, so that it is caused to deflect at a substantially central portion thereof toward the turnout region 76a, resulting in producing restoring force. This causes the roller holding member 26' to be forced in a Y direction in FIGS. 5 and 8, so that each of the rollers 14 may be constantly forced toward the shallowest region 74 of the roller receiving recess 16.

Then, when the operation of opening the cover is started, the shaft 10 is caused to freely revolve in an X direction in FIGS. 5 and 8, because each of the rollers 14 is positioned in the turnout region 76a. When pivotal movement of the cover is stopped, torque of a predetermined level or more in the Y direction is applied to the shaft 10 by gravity of the cover, to thereby cause each of the rollers 14 to move while rolling with revolution of the shaft 10. This results in the roller 14 moving from the turnout region 76a of the roller receiving recess 16 to the shallowest region 74. However, the roller 14 fails to pass through the shallowest region 74, to thereby effectively prevent the shaft 10 from rotating in the Y direction. Thus, the pivoted cover is permitted to be stopped or kept stationary at any desired position.

When torque of a predetermined level or more in a direction of closing the pivoted cover is applied thereto to forcibly revolve the shaft 10 in the Y direction, each of the rollers 14 resiliently expands the shallowest region 74 of the roller receiving recess 16 because of the reduced thickness portion 36, to thereby move through the expanded shallowest region 74 to the other turnout region 76b. This causes the roller holding member 26' to move in a slight amount in the Y direction, to thereby deflect each of the springs 48' in a direction opposite to the direction described above. This permits the shaft to freely revolve in the Y direction. However, revolution of the shaft 10 in the X direction is positively prevented, because the springs 48' and roller holding member 26' force the rollers 15 toward the shallowest regions 74 of the roller positioning members 24, to thereby cause each of the rollers 15 to be restrained at the shallowest region 74.

When it is desired to open the cover again after closing it, torque of a predetermined level or more is applied to the shaft 10 to forcibly revolve it in the X direction. This causes each of the rollers 14 to expand the shallowest region 74 of the roller receiving recess 16, resulting in moving through the region 74 to the turnout region 76a, so that revolution of the shaft 10 in a direction of opening the cover may be freely carried out.

The bidirectional retaining clutch of the illustrated embodiment may be connected directly to a pivoted cover of a personal computer of the lap top type or the like in such a manner as described above. Alternatively, it may be used for the personal computer in a manner to be in combination with, for example, a damper device which includes a rotor arranged in a casing so as to rotate through viscous liquid and a one-way clutch incorporated in the rotor. In such a case, the one-way clutch is associated with the shaft 10 of the bidirectional retaining clutch to act resistance force of the liquid on the shaft 10 only when the cover is moved to close the computer. The use of the bidirectional retaining clutch in such a manner permits the operation of closing the cover to be gently carried out to prevent troubles such as damage of the cover due to collision of the cover against a body of the computer and the like.

Further, the bidirectional retaining clutch of the illustrated embodiment may be conveniently directed to applications other than such a pivoted cover as described above. For example, it may be applied to a door sheave of a sliding door adapted to travel on a rail obliquely arranged. This permits the stopping of movement of the sliding door and the reversal of the door to be readily and positively carried out at any desired position during the door opening and closing operation.

In the illustrated embodiment, the roller positioning members 24 each are made of sheet materials formed by pressing and laminated on one another in view of the manufacturing cost. However, they may be formed by monobloc casting or the like.

As can be seen from the foregoing, the bidirectional retaining clutch of the illustrated embodiment permits a rotated object connected to the shaft or outer casing to freely rotate in either direction and prevents, at any desired position, reverse rotation of the rotated object moving in one direction, so that the rotated object may be stopped at any desired position while being kept open during the operation of opening or closing it. Also, the bidirectional retaining clutch effectively prevents it from undesirously rotating in an opposite direction even when unexpected external force is applied thereto after the operation. Thus, it will be noted that the clutch may be conveniently used for various applications such as a pivoted cover of a personal computer of the lap top type, a door sheave of a sliding door and the like.

Further, in the illustrated embodiment, the springs are held in the roller holding member formed into a rigid body to permit force of a predetermined level or more to be uniformly applied to a plurality of the rollers.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A bidirectional retaining clutch comprising
a shaft;
an outer cylindrical structure fitted on said shaft;
said shaft and outer cylindrical structure being arranged so as to be rotated relative to each other;
rollers arranged between said shaft and said outer cylindrical structure;
roller receiving recesses for receiving said rollers therein, respectively;
said roller receiving recesses being provided on any one of an inner surface of said outer cylindrical structure and an outer surface of said shaft in a manner to be spaced from one another in a circumferential direction of said shaft or outer cylindrical structure;
said roller receiving recesses each being formed into a substantially elliptic shape in section of which the major axis is defined in the circumferential direction of said shaft or outer cylindrical structure so as to have a bottom surface section and curved side surface sections contiguous to both sides of said bottom surface section;
said bottom surface section and curved side surface sections of each of said roller receiving recesses being formed in such a manner that the shallowest portion of said roller receiving recess is defined between said bottom surface section of said roller receiving recess and the outer surface of said shaft or the inner surface of said outer cylindrical structure and is smaller than the diameter of said roller;
the portion of said outer cylindrical structure or shaft at which each of said roller receiving recesses is provided being formed so as to be resiliently deformable to expand said shallowest portion of said roller receiving recess to a degree sufficient to permit said roller to pass through said shallowest portion when force of a predetermined level or more is applied to said portion; and
a pressing means for constantly forcing the roller positioned at any one of said curved side surface sections of each of the roller receiving recesses toward said shallowest portion of said receiving recess.

2. A bidirectional retaining clutch as defined in claim 1, wherein said resiliently deformed portion positionally corresponds to said bottom surface section of said roller receiving recess.

3. A bidirectional retaining clutch as defined in claim 2, wherein said resiliently deformed portion is formed into a reduced thickness.

4. A bidirectional retaining clutch as defined in claim 1, wherein said bottom surface sections of said roller receiving recesses each are formed so as to be substantially parallel to a tangent line of a portion of said outer cylindrical structure or shaft opposite to the central portion of said bottom surface section.

5. A bidirectional retaining clutch as defined in claim 4, wherein said roller receiving recesses are provided on the inner surface of said outer cylindrical structure.

6. A bidirectional retaining clutch as defined in claim 5, wherein said outer cylindrical structure comprises an outer casing formed into a hollow cylindrical shape, two roller positioning members of a substantially annular shape arranged in said casing in a manner to be spaced from each other in an axial direction of said casing to define a space therebetween, and two pressing pin holding members of a substantially annular shape arranged between said roller positioning members in said casing in a manner to be spaced from each other.

7. A bidirectional retaining clutch as defined in claim 6, wherein said pressing means comprises a plurality of pressing pins provided in said pressing pin holding members in a manner to be spaced from one another in a circumferential direction thereof and a single pressing strip of an endless shape fitted on said pressing pins to resiliently inward force said pressing pins.

8. A bidirectional retaining clutch as defined in claim 7, wherein said roller receiving recesses are formed on an inner surface of said roller positioning members.

9. A bidirectional retaining clutch as defined in claim 8, wherein said pressing means is arranged between said roller positioning members in an axial direction of said clutch and between said outer casing and said shaft in a diametric direction thereof.

10. A bidirectional retaining clutch as defined in claim 9, wherein two said pressing pins are provided for each of said rollers to force said roller.

11. A bidirectional retaining clutch as defined in claim 6, wherein said roller positioning members and pressing pin holding members each are made of a plurality of sheet materials formed by pressing and laminated on one another.

12. A bidirectional retaining clutch as defined in claim 1, wherein said bottom surface sections of said roller receiving recesses each are formed so as to project at a central portion thereof.

13. A bidirectional retaining clutch as defined in claim 12, wherein said roller receiving recesses are provided on the inner surface of said outer cylindrical structure.

14. A bidirectional retaining clutch as defined in claim 13, wherein said outer cylindrical structure comprises an outer casing, a pair of roller positioning members of a substantially annular shape arranged in said outer casing so as to be spaced from each other in an axial direction of said clutch to define a space therebetween and a roller holding member of a substantially annular shape arranged between said roller positioning members in said axial direction for holding said pressing means as well as said rollers therein.

15. A bidirectional retaining clutch as defined in claim 14, wherein said roller receiving recesses are formed on an inner surface of said roller positioning members.

16. A bidirectional retaining clutch as defined in claim 15, wherein said pressing means comprises a plurality of springs.

17. A bidirectional retaining clutch as defined in claim 16, wherein said roller holding member is formed on an inner surface thereof with a plurality of roller holding grooves for holding said rollers therein in a manner to be spaced from one another in a circumferential direction thereof and extend in an axial direction thereof and on an outer surface thereof with spring holding grooves for holding said springs therein in a manner to be spaced from one another in a circumferential direction thereof and extend in an axial direction thereof.

18. A bidirectional retaining clutch as defined in claim 17, wherein said roller holding grooves and spring holding grooves are arranged so as to positionally corresponds to each other.

19. A bidirectional retaining clutch as defined in claim 14, wherein said roller positioning members each are made of a plurality of sheet materials which have been pressed and laminated together.

20. A bidirectional retaining clutch as defined in claim 14, wherein said roller positioning members each are made of a rigid material.

21. A bidirectional retaining clutch comprising:
an outer casing formed into a hollow cylindrical shape;
a shaft inserted through said outer casing;
said outer casing and shaft being arranged so as to be rotated relative to each other;
pair of roller positioning members of a substantially annular shape arranged in said casing in a manner to be spaced from each other in an axial direction of said casing to define a space therebetween and each formed on an inner peripheral surface thereof with a plurality of roller receiving grooves;
a pair of pressing pin holding members of a substantially annular shape arranged between said roller positioning members in said casing in a manner to be spaced from each other in said axial direction;
a plurality of rollers received in said roller receiving grooves of each of said roller receiving members, respectively; and
a pressing means for forcing said rollers;
said roller receiving recesses each being formed into a substantially elliptic shape in section of which the major axis is defined in a circumferential direction of said roller positioning member so as to have a bottom surface section and curved side surface sections formed contiguous to both sides of said bottom surface section;
said bottom surface section and curved side surface sections of each of said roller receiving recesses being formed in such a manner that the shallowest portion of said roller receiving recess is defined between a central portion of said bottom surface section of said roller receiving recess and the outer surface of said shaft and is smaller than the diameter of said roller;
said bottom surface sections of said roller receiving recesses each being formed so as to be substantially parallel to a tangent line of a portion of said shaft opposite to the central portion of said bottom surface section;

the portion of each of said roller positioning members at which each of said roller receiving recesses is provided being formed into a reduced thickness, resulting in being resiliently deformable to expand said shallowest portion of said recess to a degree sufficient to permit said roller to pass through said shallowest portion when force of a predetermined level or more is applied to said portion;

said pressing means comprising a plurality of pressing pins provided in said pressing pin holding members in a manner to be spaced from one another in a circumferential direction thereof and a single pressing strip of an endless shape fitted on said pressing pins to resiliently inward force said pressing pins.

22. A bidirectional retaining clutch comprising:

an outer casing formed into a hollow cylindrical shape;

a shaft inserted through said outer casing; be rotated relative to each other;

a roller holding member formed into a substantially annular shape to permit said shaft to be inserted therethrough and arranged between said casing and said shaft in a diametric direction of the clutch;

said roller holding member being formed on an inner peripheral surface thereof with a plurality of roller holding grooves;

a plurality of rollers held in said roller holding grooves of said roller holding member, respectively;

a pair of roller positioning members each formed into a substantially annular shape and arranged in a manner to interpose said roller holding member therebetween in an axial direction of said clutch and fixed with respect to said outer casing; and a pressing means for forcing said rollers;

said roller positioning members each being formed on an inner peripheral surface thereof with a plurality of roller receiving recesses for receiving said rollers therein, respectively;

said roller receiving recesses each being formed into a substantially elliptic shape in section of which the major axis is defined in a circumferential direction of said roller positioning member so as to have a bottom surface section formed to project at a central portion thereof and curved side surface sections formed contiguous to both sides of said bottom surface section;

said bottom surface section and curved side surface sections of each of said roller receiving recesses being formed in such a manner that the shallowest portion of said roller receiving recess is defined between said central portion of said bottom surface section of said roller receiving recess and the outer surface of said shaft and is smaller than the diameter of said roller;

the portion of each of said roller positioning members at which each of said roller receiving recesses is provided being formed into a reduced thickness, resulting in being resiliently deformable to expand said shallowest portion of said recess to a degree sufficient to permit said roller to pass through said shallowest portion when force of a predetermined level or more is applied to said portion;

said roller holding member being formed on an outer peripheral surface thereof with a plurality of spring holding grooves; and said pressing means comprising a plurality of springs held in said spring holding grooves of said roller holding member to regulate rotation of said roller holding member to urge said rollers in a predetermined direction, to thereby constantly force each of said rollers positioned at any one of said curved side surface sections of each of said roller receiving recesses toward the shallowest portion of said recess.

* * * * *